US011176412B2

(12) United States Patent
Nie

(10) Patent No.: US 11,176,412 B2
(45) Date of Patent: Nov. 16, 2021

(54) SYSTEMS AND METHODS FOR ENCODING IMAGE FEATURES OF HIGH-RESOLUTION DIGITAL IMAGES OF BIOLOGICAL SPECIMENS

(71) Applicant: Ventana Medical Systems, Inc., Tucson, AZ (US)

(72) Inventor: Yao Nie, Sunnyvale, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 253 days.

(21) Appl. No.: 16/612,170

(22) PCT Filed: Nov. 2, 2017

(86) PCT No.: PCT/EP2017/077999
§ 371 (c)(1),
(2) Date: Nov. 8, 2019

(87) PCT Pub. No.: WO2018/083142
PCT Pub. Date: May 11, 2018

(65) Prior Publication Data
US 2020/0175325 A1 Jun. 4, 2020

Related U.S. Application Data

(60) Provisional application No. 62/416,660, filed on Nov. 2, 2016.

(51) Int. Cl.
*G06K 9/00* (2006.01)
*G06K 9/62* (2006.01)
(Continued)

(52) U.S. Cl.
CPC ......... *G06K 9/6228* (2013.01); *G06K 9/0014* (2013.01); *G06K 9/469* (2013.01);
(Continued)

(58) Field of Classification Search
CPC ......... G06T 7/0012; G06T 2207/20081; G06T 2207/30004; G06T 2207/30024;
(Continued)

(56) References Cited

U.S. PATENT DOCUMENTS

2009/0148011 A1* 6/2009 Zhao ...................... G16H 50/20
382/128
2014/0056518 A1* 2/2014 Yano ......................... G06T 7/11
382/173

OTHER PUBLICATIONS

Su, "Superpixel-Based Segmentation of Glioblastoma Multiforme from Multimodal MR Images," Springer International Publishing Switzerland (Year: 2013).*
(Continued)

*Primary Examiner* — Alex Kok S Liew
(74) *Attorney, Agent, or Firm* — Kilpatrick Townsend & Stockton LLP

(57) ABSTRACT

An image analysis system for analyzing biological specimen images is disclosed. The system may include: a superpixel generator configured to obtain a biological specimen image and group pixels of the biological specimen image into a plurality of superpixels; a feature extractor configured to extract, from each superpixel in the plurality of superpixels, a feature vector comprising a plurality of image features; a clustering engine configured to assign the plurality of superpixels to a predefined number of clusters, each cluster being characterized by a centroid vector of feature vectors of superpixels assigned to the cluster; and a storage interface configured to store, for each superpixel in the plurality of superpixels, clustering information identifying the one cluster to which the superpixel is assigned. The system may also include a graph engine configured construct a graph based on the stored information, and use the graph to perform a graph-based image processing task.

17 Claims, 8 Drawing Sheets

(51) Int. Cl.
*G06T 7/11* (2017.01)
*G06K 9/46* (2006.01)

(52) U.S. Cl.
CPC ......... *G06K 9/6215* (2013.01); *G06K 9/6223* (2013.01); *G06K 9/6253* (2013.01); *G06T 7/11* (2017.01); *G06T 2207/10056* (2013.01); *G06T 2207/20072* (2013.01); *G06T 2207/30024* (2013.01)

(58) Field of Classification Search
CPC ... G06T 7/11; G06T 2207/10056; G06T 7/12; G06T 2207/10081; G06T 2207/10116; G06T 7/0014; G06T 7/143; G06T 2207/10024; G06T 2207/10132; G06T 2207/30068; G06T 5/002; G06T 2207/20084; G06T 2207/30048; G06T 7/74; G06T 2207/10016; G06T 2207/20064; G06T 2207/30056; G06T 2207/10088; G06T 2207/20016; G06T 2207/20036; G06K 9/00147; G06K 9/0014; G06K 2209/01; G06K 9/00442; G06K 9/48; G06K 9/6218; G06K 9/6223; G06K 9/72; G06K 9/4604; G06K 9/6267; G06K 9/4652; G06K 9/52; G06K 9/4642; G06K 9/4671; G06K 9/481
See application file for complete search history.

(56) References Cited

OTHER PUBLICATIONS

Farzad Ghaznavi, et al, Annual Review of Pathology: Mechanisms of Diseasy, Digital Imaging in Pathology Whole-Slide Imaging and Beyond, 2013, pp. 331-359, vol. 8 No. 1.
Gurcan, et al, IEEE Reviews in Biomedical Engineering, Histopathological Image Analysis: A Review, 2009, pp. 147-171, vol. 2, National Institutes of Health.
International Search Report and Written Opinion, dated Mar. 2, 2018, in corresponding PCT/EP2017/077999, filed Nov. 2, 2017, pp. 1-5.
Mercan, et al, Journal of Digital Imaging, Localization of Diagnostically Relevant Regions of Interest, 2016, pp. 499-502, vol. 29.
Pete, qupath/qupath, Classifying Objects, 2018, pp. 1-15, 1.
Shazia Akbar, University of Dundee—Thesis, Tumour Localisation in Histopathology Images, 2015, pp. 1-161, 1.
Wright, et al, Procedia Computer Science, Incorporating local and global context for better automated analysis, 2016, pp. 125-131, 90.

* cited by examiner

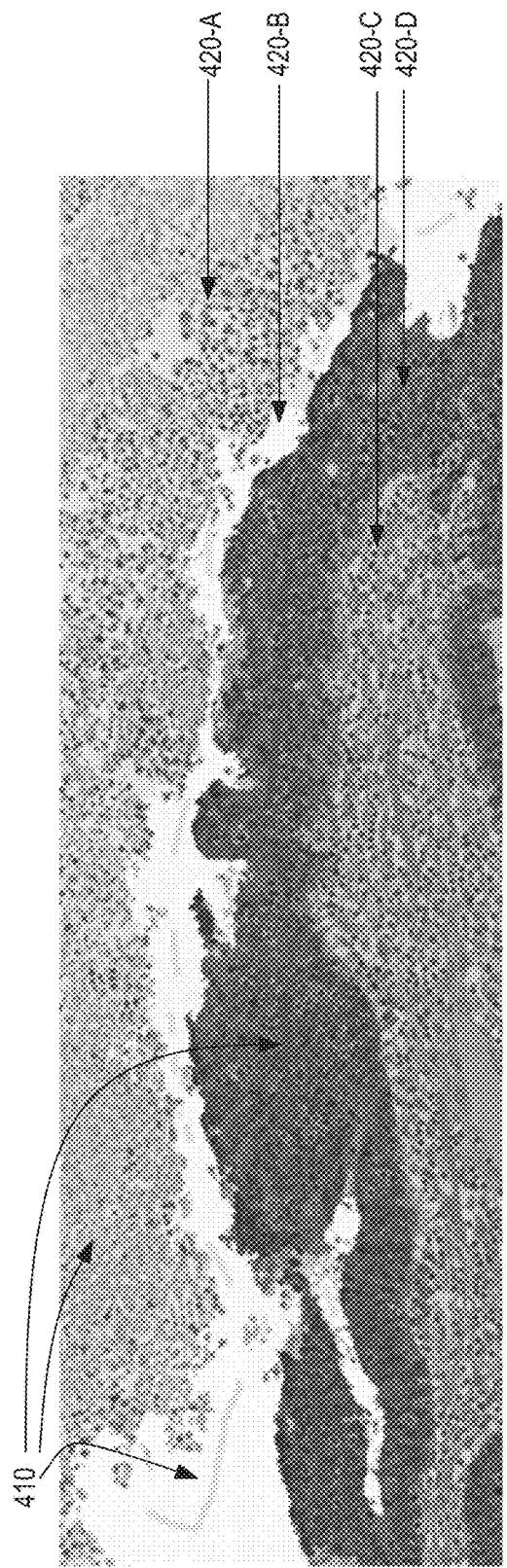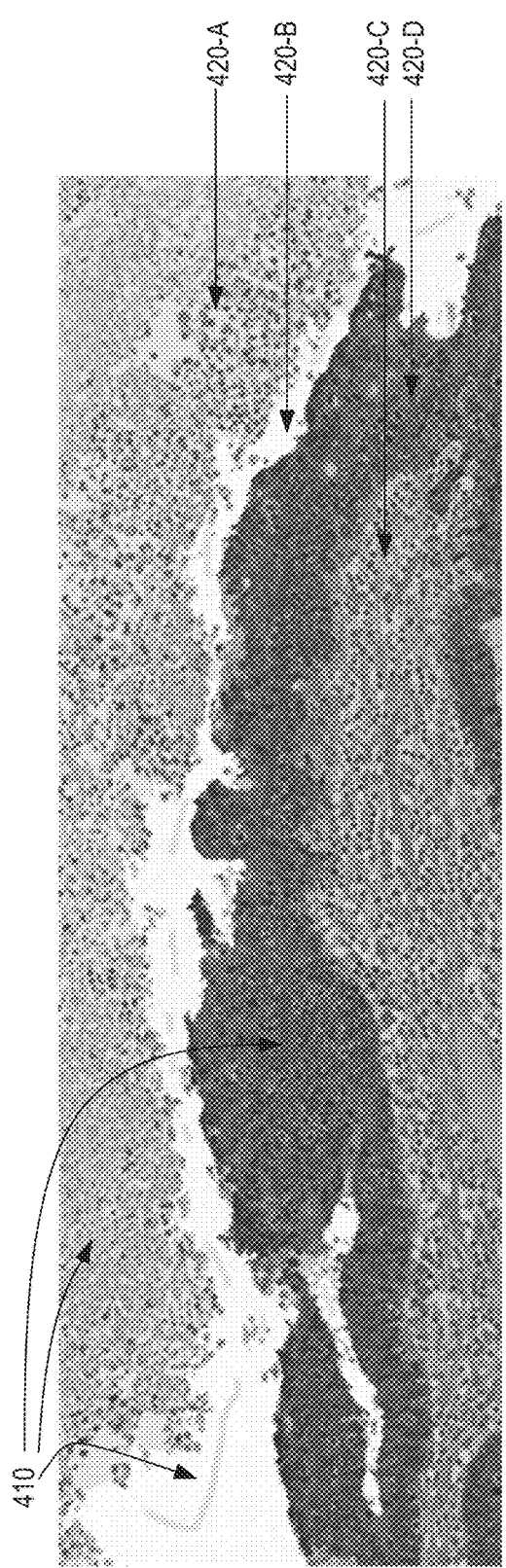

SYSTEMS AND METHODS FOR ENCODING IMAGE FEATURES OF HIGH-RESOLUTION DIGITAL IMAGES OF BIOLOGICAL SPECIMENS

CROSS-REFERENCES TO RELATED APPLICATIONS

This is a continuation of International Patent Application No. PCT/EP2017/077999, filed Nov. 2, 2017, which claims the benefit and priority of U.S. Provisional Application Ser. No. 62/416,660, filed Nov. 2, 2016, both of which applications are incorporated herein by reference.

FIELD OF THE INVENTION

The present disclosure generally relates to the field of medical imaging. Some examples discussed in the present disclosure relate to methods of efficiently encoding vast amounts of image features of extracted from high-resolution digital images of biological specimens, where the encoded image features can be decoded and used by an image analysis system for performing various image analysis tasks.

BACKGROUND AND RELATED ART

In the analysis of biological specimens such as tissue sections, cytology images, tissue microarray (TMA) images, cell lines, blood smears, and the like, the biological specimens are sometimes stained with one or more different stains or dyes in order to highlight various types of structures within the specimen, such as specific types of tissue, cells, cell organelles, and so forth. This can enable pathologists and other health care professionals to better assess the specimen's morphology and deliver a more accurate diagnosis, prognosis, and treatment plan for the patient.

One method of staining the specimen is hematoxylin and eosin (H&E) staining, in which a dark blue or violet hematoxylin binds to basophilic substances such as DNA and RNA, and a red or pink eosin binds to acidophilic substances such as positively charged amino acid side chains. Thus, cell nuclei on specimen slides stained with H&E are likely to appear in blue or purple, while structures like the cytoplasm, basophils, muscles, erythrocytes, collagen, and mitochondria are likely to appear in different shades of pink or red.

Immunohistochemistry (IHC) staining is another staining technique that has become popular due to its significant efficiencies and the rich diagnostic information that it generates. IHC slide staining can be utilized to identify proteins in cells of a tissue section and hence is widely used in the study of different types of cells, such as cancerous cells and immune cells in biological tissue. For example, IHC staining may be used in research and clinical settings to understand the distribution and localization of the differentially expressed biomarkers of immune cells in a cancerous tissue for an immune response study. For example, tumors often contain infiltrates of immune cells, which may prevent the development of tumors or favor the outgrowth of tumors. In this scenario, multiple stains may be used to target different types of immune cells, and the population distribution of each type of immune cell is used in studying the clinical outcome of the patients.

In situ hybridization (ISH) staining is a technique that uses a labeled complementary DNA, RNA or modified nucleic acids strand (i.e., probe) to localize a specific DNA or RNA sequence in a portion or section of tissue. In situ hybridization can be a powerful technique for identifying specific mRNA species within individual cells in tissue sections, providing insights into physiological processes and disease pathogenesis.

Researchers and clinicians have traditionally examined tissue slides stained with H&E, IHC, ISH, fluorescent ISH (FISH), or other methods under a bright-field or a fluorescence microscope. However, as the assays are becoming more complicated and often require locating and counting of hundreds or thousands of cells of specific types in specific types of regions, performing these tasks manually (and accurately) becomes an increasingly difficult task. Accordingly, more and more researchers and clinicians are beginning to employ "digital pathology" solutions that can help them get faster, more accurate, and more reproducible results. Digital pathology systems include slide scanners that can scan tissue slides to produce very high resolution (e.g., 0.5 or 0.275 microns per pixel) digital images of the tissue. Digital pathology systems also include hardware and/or software solutions for automatically processing, viewing, segmenting, analyzing (e.g., scoring) and otherwise managing tissue images or other types of biological specimen images.

In order to automatically analyze a biological specimen image, a pre-processing step of image feature extraction is often required. During feature extraction, various image features such as pixel intensities, pixel intensity gradients (magnitude and direction), and the like can be extracted from the image. The features can then be used by image analysis tasks such as region segmentation, cell segmentation, scoring, image retrieval, and the like.

However, image feature extraction can be one of the most computationally expensive step in the image analysis pipeline, because high-dimensional features are often required to characterize the complex image contents. In digital pathology, the computational requirements are even higher because of the immense data density of digitized whole slide images. Therefore, in digital pathology and other applications processing high-resolution images of biological specimens, it is desirable to precompute the image features and store them, thereby avoiding multiple redundant computations.

For example, a pathologist may be interested in analyzing one region of interest of an image, and later in another region of interest in the same image, which may or may not overlap with the first region. In another example, the pathologist may want to compare one image with another image acquired for the same patient based on a new stain or morphology metric. In both examples, if the image features of the image are accessible without re-computing, the process for the new image analysis task can be significantly more efficient. In addition, for some image analysis tasks, image feature pre-computation can be indispensable to provide real-time user experience. For example, interactive image segmentation task may require the user to mark various image segments, to check the resulting segmentation, and to add additional marking to refine the segmentation. To enable this interactive process, the segmentation results after each marking need to be generated within seconds or fractions of a second. Accordingly, the amount of real-time re-computations needs to be minimized.

SUMMARY

Disclosed herein are systems and methods for analyzing biological specimen images. The system may include, for example, a superpixel generator configured to obtain a biological specimen image and group pixels of the biological specimen image into a plurality of superpixels; a feature extractor configured to extract, from each superpixel in the plurality of superpixels, a feature vector comprising a plurality of image features; a clustering engine configured to assign the plurality of superpixels to a predefined number of clusters, each cluster being characterized by a centroid vector of feature vectors of superpixels assigned to the cluster; and a storage interface configured to store, for each superpixel in the plurality of superpixels, clustering information identifying the one cluster to which the superpixel is assigned. The system may also include a graph engine configured construct a graph based on the stored information, and use the graph to perform a graph-based image processing task.

In some aspects, the system may also include a graph engine configured to obtain the clustering information stored by the storage interface; based at least on the clustering information, construct a graph comprising a plurality of nodes, wherein adjacent nodes correspond to adjacent superpixels in the biological specimen image and are connected by a weighted edge, wherein the weighted edge has a weight corresponding to a distance between clusters to which the adjacent superpixels belong; and use the graph to perform a graph-based image processing task. In some aspects, the graph-based image processing task can be a segmentation operation that groups the plurality of superpixels into a plurality of segments.

In some aspects, the clustering engine can be further configured to precalculate distances between each two clusters in the predefined number of clusters; the storage interface can be further configured to store the precalculated distances; and the graph engine can be further configured to obtain the precalculated distances stored by the storage interface, and to construct the graph based on the precalculated distances.

In some aspects, the storage interface can be further configured to store centroid vectors of the predefined number of clusters; and the graph engine can be further configured to obtain the centroid vectors, to calculate distances between each two clusters in the predefined number of clusters based on the centroid vectors, and to construct the graph based on the calculated distances.

In some aspects, the system may also include a user-interface module configured to collect from a user at least one annotation identifying a plurality of same-segment superpixels in the biological specimen image. In some aspects, the clustering engine can be further configured to determine, based on the at least one annotation, a set of feature weights associated with the plurality of image features. In some aspects, the clustering engine can be configured to assign the plurality of superpixels to the predefined number of clusters based at least on the determined set of feature weights.

In some embodiments, a method of encoding image features of a biological specimen image obtained by a slide scanner is disclosed. The method may include: obtaining the biological specimen image; grouping pixels of the biological specimen image into a plurality of superpixels; for each superpixel, extracting a feature vector comprising a plurality of image features characterizing the superpixel; based on the feature vectors extracted for the plurality of superpixels, generating (e.g., using k-means clustering) a predefined number of clusters, each cluster being characterized by a centroid vector, and associating each superpixel with a cluster whose centroid vector is the closest to the feature vector of the superpixel; for each superpixel, storing an identifier of a cluster whose centroid vector is closest to the feature vector of the superpixel; and storing the centroid vector of each cluster in the plurality of clusters and/or distances between each two clusters in the predefined number of clusters.

In some aspects, the method may further include precalculating the distances between each two clusters within the predefined number of clusters. Furthermore, in some aspects, the method may also include retrieving the centroid vector of each cluster and/or the distances between each two clusters, and using the centroid vector of each cluster and/or the distances between each clusters to construct a graph; and performing a graph-based image processing task based on the graph.

In some embodiments, a non-transitory computer-readable medium storing instructions is disclosed. The instructions, when executed by a processing resource of a computing system, can cause the computing system to obtain a biological specimen image; group pixels of the biological specimen image into a plurality of superpixels; for each superpixel, extract a feature vector comprising a plurality of image features characterizing the superpixel; based on the feature vectors extracted for the plurality of superpixels, generate a predefined number of clusters, each cluster being characterized by a centroid vector, and associate each superpixel with a cluster whose centroid vector is the closest to the feature vector of the superpixel; for each superpixel, store an identifier of a cluster whose centroid vector is closest to the feature vector of the superpixel; and store the centroid vector of each cluster in the plurality of clusters and/or distances between each two clusters in the predefined number of clusters.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the following embodiments of the invention are explained in greater detail, by way of example only, making reference to the drawings in which:

FIG. 4A shows an exemplary biological specimen image overlaid with results of a segmentation operation operating on non-compressed data;

FIG. 4B shows the exemplary biological specimen image of FIG. 4A, overlaid with results of a segmentation operation operating on compressed data;

DETAILED DESCRIPTION

As mentioned above, it is desirable to pre-compute and store image features for the entire image of a biological specimen in order to reduce redundant computations and enable a real-time experience for the user. In some applications, however, the amount of image features to be stored is so vast that to store them all may require large amounts of memory, and the storage and retrieval operations themselves may require significant amounts of time (e.g., several seconds or more). This is especially true for web-based applications and other applications where the features are stored on a remote server accessible by the client application through a local area network or a wide area network such as the Internet. In such applications, retrieving all the precomputed image features in real time may take too long and may not enable an interactive real-time user experience.

Systems and methods described below provide a technical solution to the above described problem of real-time retrieval of precomputed image features of high-density and high-resolution digital images of biological specimen. It is appreciated by a person skilled in the art that the problem arises specifically in the realm of computers, computer networks, and real-time image processing of high-resolution digital images. It is further appreciated that the systems and methods described herein are not limited to solving the particular problem stated above, and can also be utilized in other types of applications facing other types of issues that may or may not be related to performance or storage optimization.

Figure 1:
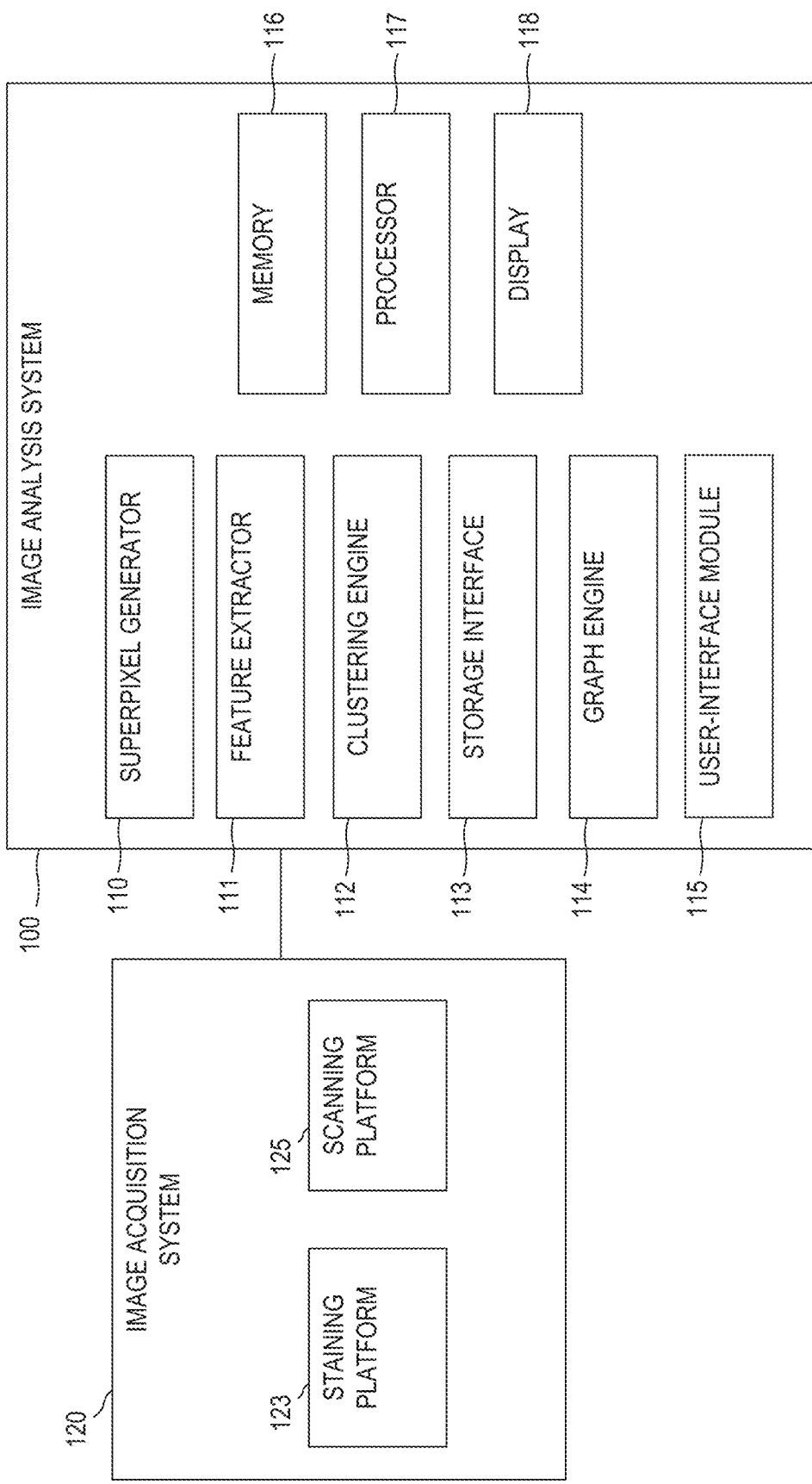
FIG. 1 shows a block diagram of an exemplary image analysis system and an exemplary image acquisition system.

FIG. 1 is a block diagram of an image analysis system 100, according to an exemplary embodiment of the subject disclosure. Image analysis system 100 may include one or more computing devices such as desktop computers, laptop computers, tablets, smartphones, servers, application-specific computing devices, or any other type(s) of electronic device(s) capable of performing the techniques and operations described herein. In some embodiments, image analysis system 100 may be implemented as a single device. In other embodiments, image analysis system 100 may be implemented as a combination of two or more devices together achieving the various functionalities discussed herein. For example, image analysis system 100 may include one or more server computers and a one or more client computers communicatively coupled to each other via one or more local-area networks and/or wide-area networks such as the Internet.

As illustrated in FIG. 1, image analysis system 100 may include a memory 116, a processor 117, and a display 118. Memory 116 may include any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. For brevity purposes memory 116 is depicted in FIG. 1 as a single device, but it is appreciated that memory 116 can also be distributed across two or more devices.

Processor 117 may include one or more processors of any type, such as central processing units (CPUs), graphics processing units (GPUs), special-purpose signal or image processors, field-programmable gate arrays (FPGAs), tensor processing units (TPUs), and so forth. For brevity purposes processor 117 is depicted in FIG. 1 as a single device, but it is appreciated that processor 117 can also be distributed across any number of devices.

Display 118 may be implemented using any suitable technology, such as LCD, LED, OLED, TFT, Plasma, etc. In some implementations, display 118 may be a touch-sensitive display (a touchscreen).

As illustrated in FIG. 1, image analysis system 100 may also include a superpixel generator 110, a feature extractor 111, a clustering engine 112, a storage interface 113, a graph engine 114, and a user-interface module 115. While these modules are depicted in FIG. 1 as standalone modules, it will be evident to persons having ordinary skill in the art that each module may instead be implemented as a number of sub-modules, and that in some embodiments any two or more modules can be combined into a single module. Furthermore, in some embodiments, system 100 may include additional engines and modules (e.g., input devices, networking and communication modules, etc.) not depicted in FIG. 1 for brevity. Furthermore, in some embodiments, some of the blocks depicted in FIG. 1 may be disabled or omitted. As will be discussed in more detail below, the functionality of some or all modules of system 100 can be implemented in hardware, software, firmware, or as any combination thereof.

As depicted in FIG. 1, in some embodiments image analysis system 100 may be communicatively coupled to an image acquisition system 120. Image acquisition system 120 may obtain images of biological specimens and provide those images to image analysis system 100 for analysis and presentation to the user.

Image acquisition system 120 may include an automated staining platform 123 for staining biological specimen slides using H&E, IHC, ISH, FISH, or any other staining process. Commercially available staining platforms include, for example, HE 600, BENCHMARK XT, and BENCHMARK ULTRA products by Ventana Medical Systems, Inc. Image acquisition system 120 may also include a scanning platform 125 such as a slide scanner that can scan the stained slides at 20×, 40×, or other magnifications to produce high resolution whole-slide digital images. Commercially available slide scanners include, for example, VENTANA iScan HT and iScan Coreo products by Ventana Medical Systems, Inc.

Images generated by scanning platform 125 may be transferred to image analysis system 100 or to a server or database accessible by image analysis 100. In some embodiments, the images may be transferred automatically via one or more local-area networks and/or wide-area networks. In some embodiments, image analysis system 100 may be integrated with or included in scanning platform 125 and/or other modules of image acquisition system 120, in which case the image may be transferred to image analysis system, e.g., through a memory accessible by both platform 125 an system 120. In some embodiments, image acquisition system 120 may not be communicatively coupled to image analysis system 100, in which case the images may be stored on a non-volatile storage medium of any type (e.g., a flash drive) and downloaded from the medium to image analysis system 100 or to a server or database communicatively coupled thereto. In any of the above examples, image analysis system 100 may obtain an image of a biological sample, where the sample may have been affixed to a slide and stained by staining platform 123, and where the slide may have been scanned by a slide scanner or another type of scanning platform 125. It is appreciated, however, that in other embodiments, below-described techniques may also be applied to images of biological samples acquired through other means.

After obtaining an image of a biological specimen, image analysis system 100 may pass the image to superpixel generator 110. Superpixel generator 110 may receive the image and divide it (i.e., group its pixels) into a plurality of superpixels. Each superpixel may include a perceptually meaningful atomic region comprising a plurality of pixels.

Superpixels can capture local image redundancy and provide a convenient primitive from which the image features can be computed, as discussed below. Processing the image in units of superpixels is generally much more computationally efficient than pixel based processing, especially for very high resolution images such as images of biological specimens. Superpixel generator 110 can generate (i.e., group the pixels into) superpixels using any of the available techniques, such as the techniques described in R. Achanta, A. Shaji, K. Smith, A Lucchi, P. Fua and S. Susstrunk, "SLIC superpixels compared to state-of-art superpixel methods," in Pattern Analysis and Machine Intelligence 2012; P. Felzenszwalb and D. Huttenlocher, "Efficient Graph-Based Image Segmentation," in Intl J. Computer Vision, vol. 59, no. 2, pp. 167-181, September 2004; A. Levinshtein, A. Stere, K. Kutulakos, D. Fleet, S. Dickinson, and K. Siddiqi, "Turbopixels: Fast superpixels using geometric flows," in IEEE Transactions on Pattern Analysis and Machine Intelligence (PAMI), 2009; J. Shi and J. Malik, "Normalized cuts and image segmentation," in IEEE Transactions on Pattern Analysis and Machine Intelligence (PAMI), 22(8):888-905, August 2000; and/or O. Veksler, Y. Boykov, and P. Mehrani, "Superpixels and supervoxels in an energy optimization framework," in European Conference on Computer Vision (ECCV), 2010. It is appreciated that in some embodiments, the biological sample image obtained by system 100 may have already been divided into superpixels, i.e., superpixel boundaries have been already generated and provided to system 100, in which case superpixel generator 110 may be omitted from or disabled in system 100.

Figure 2:
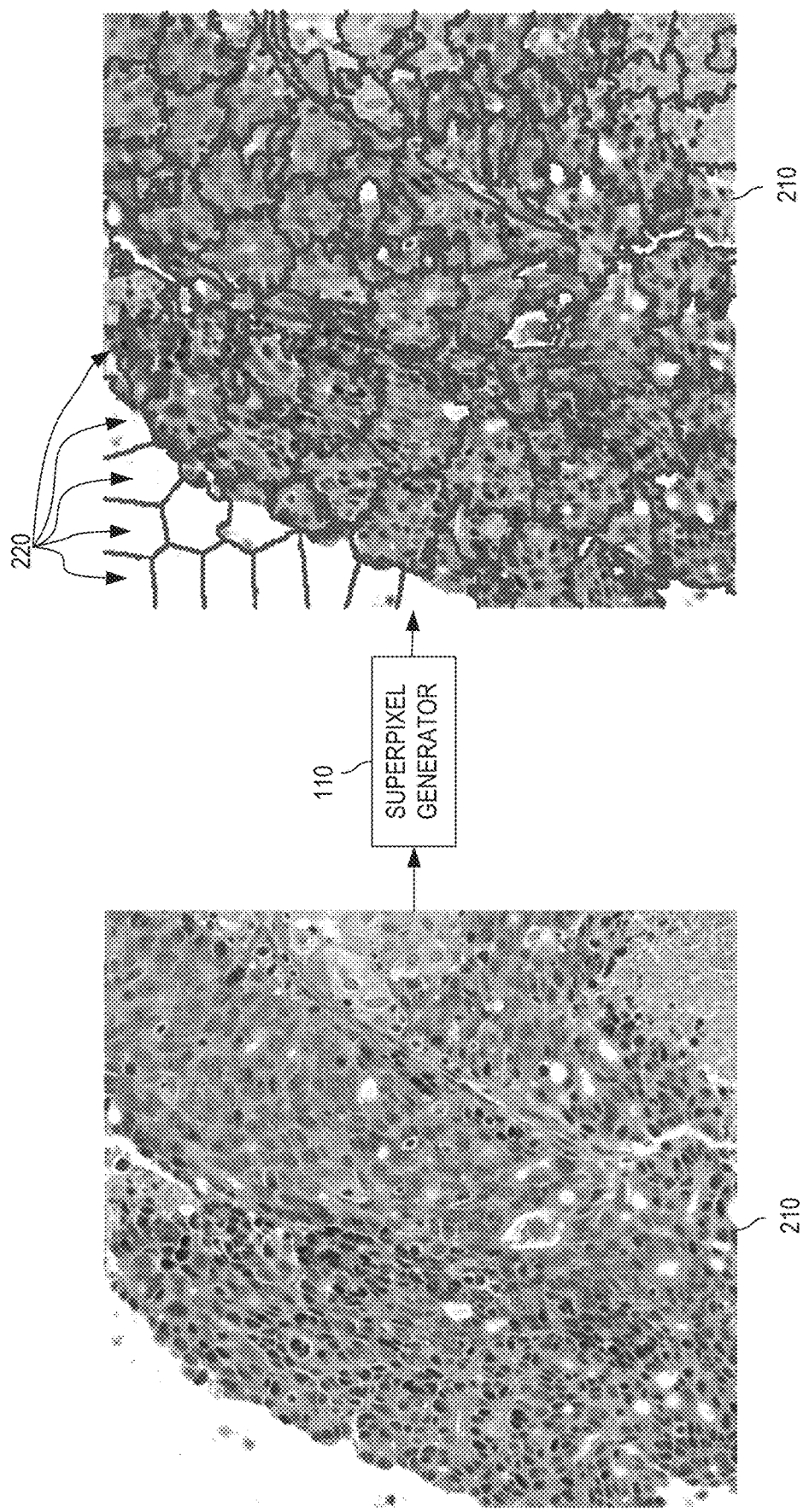
FIG. 2 shows an exemplary biological specimen image being processed by a superpixel generator.

FIG. 2 shows an exemplary biological specimen image 210 (in this example, an H&E image), and an exemplary plurality of superpixels 220 generated for image 210 by superpixel generator 110. Based on this example, it is appreciated that each superpixel can include the same number of pixels or a different number of pixels (e.g., within a certain range), but in either case the number of superpixels can be significantly (e.g., one or more orders of magnitude) lower than the number of pixels in image 210.

After superpixels have been generated by superpixel generator 110 (or otherwise obtained by system 100), the superpixels can be provided to feature extractor 111. Feature extractor 111 may extract from (or generate for) each superpixel a plurality of image features characterizing (or representing) the superpixel. As discussed above, the extracted image features may include, for example, texture features such Haralick features, bag-of-words features and the like. The values of the plurality of image features may be combined into a high-dimensional vector, hereinafter referred to as the "feature vector" characterizing the superpixel. For example, if M features are extracted for each superpixel, each superpixel can be characterized by an M-dimensional feature vector.

After feature vectors have been calculated for each superpixel by feature extractor 111, the feature vectors can be provided to clustering engine 112. Clustering engine 112 may then cluster the superpixels by assigning each superpixel to a particular cluster of superpixels. Thus, for example, clustering engine 112 may generally cluster N superpixels into K clusters. The clustering may be performed based on the similarities of the feature vectors associate with each superpixel. For example, each cluster may be associated with a centroid vector, such that feature vector of each superpixel in the cluster is closest to the centroid vector of that cluster than to the centroid of any other cluster.

In some embodiments, the number of clusters K can be predefined for a particular application. For example, for a typical image segmentation problem in which the image needs to be segmented into a predefined maximum number of different regions (e.g., 5), K clusters can be set to a number that is larger but is within the order of magnitude of the predefined maximum number of regions (e.g., 15, 20, or 25). In some examples, the number of clusters K can be dynamically adjusted based on user input.

In some embodiments, clustering engine 112 may cluster the superpixels using a k-means clustering algorithm such as the Lloyd's algorithm, or using any related clustering algorithms such as the k-medians clustering algorithm; the k-medoids or the partitioning around medoids (PAM) algorithm; the Fuzzy C-Means Clustering algorithm; the Gaussian mixture models trained with expectation-maximization algorithm; the k-means++ algorithm; hierarchical variants such as Bisecting k-means, X-means clustering, or G-means clustering; and the like. In other embodiments, clustering engine 112 may use any other algorithm suitable for clustering the superpixels into a predefined number of clusters based on the similarities of superpixels' feature vectors.

K-means or other algorithms mentioned above typically perform clustering based on distances between the feature vectors and the centroid vector of each cluster. In some embodiments, clustering engine 112 may use a Euclidean distance as the distance metric for performing the clustering. In other embodiments, clustering engine 112 may use other distance metrics such as the sum of absolute differences, correlation and hamming distance, and so forth.

In some embodiments, clustering engine 112 may use a non-weighted Euclidean distance, where each image feature in the feature vector has the same weight. In other embodiments, however, clustering engine 112 may use a weighted Euclidean (or non-Euclidean) distance during clustering, weighing some image features higher than other. For example, in some embodiments, clustering engine 112 may determine and assign different feature weights to different image features. For example, clustering engine 112 may collect (e.g., using user interface module 115) at least one annotation (e.g., a scribble or a line) identifying a plurality of similar superpixels, i.e., superpixels that the user considers to belong to the same segment or category. Clustering engine 112 may then determine, based on the feature vectors of the similar superpixels, which image features in the feature vectors should be assigned higher feature weights than others. Some methods and systems of determining and assigning weights to different image features are described in U.S. Provisional Patent Application No. 62/136,381 and in International Patent Publication No. WO/2016150873, the entireties of which are hereby incorporated by reference.

In some embodiments, in addition to clustering the superpixels by assigning each superpixel into one of K clusters (where K is a predefined parameter), clustering engine 112 may precalculate the distances between every two clusters, i.e., the distances between centroid vectors of each cluster and each other cluster. Thus, in some embodiments, clustering engine 112 may precalculate at least $K(K-1)/2$ distances, which is the number of different combinations of two clusters within K clusters. Clustering engine 112 may calculate the distances between the clusters using the same measure of distance that was used for generating the clusters, for example.

After clustering engine 112 has clustered the superpixels and optionally precalculated the distances between them, storage interface 113 may store into a memory (e.g., memory 116 or any other volatile and/or non-volatile memory embedded in or coupled to system 100) either the centroid vectors of all the clusters, or the precalculated distances between the clusters, or both. It will be appreciated that for some image processing tasks, such as the segmentation task discussed in more detail below, only the differences (i.e., distances) between the different superpixels may be required. Thus, in some embodiments, only the precalculated distances between the clusters, without the clusters' centroid vectors can be stored, thereby further reducing the amount of stored data. The precalculated distances can be stored, for example, in a table such as a look-up table, or in any other type of data structure. For image processing tasks that do require the absolute values of the different image features (or at least their approximations), the clusters' centroid vectors can be stored, and the distances between the clusters may not be precalculated or stored.

In addition to storing centroid vectors of and/or distances between the clusters, storage interface 113 may store, for each superpixel, clustering information identifying the cluster to which the superpixel has been assigned. Clustering information can identify the cluster by a number (e.g., 1–K) or by any other type of identifier. Furthermore, in some embodiments, storage interface 113 may also store position information identifying the position of each superpixel within the biological sample image, or at least its relative position to other superpixels.

All information stored by storage interface 113 can later be retrieved by storage interface 113 and provided to image analysis system 100 that can perform various image processing tasks, examples of which are provided below. It should be evident to a person skilled in the art that by storing only limited amount of data for each superpixel, such as storing its clustering information without storing its feature vector containing its image features, significant reductions in memory consumption and in storage/retrieval times can be achieved. To illustrate with an example, let N be the number of superpixels generated for a given image; M be the number of image features extracted for each superpixel; U be the number of bytes representing each image feature; and K be the number of clusters. Thus, the original feature vectors for all superpixels occupy N×M×U bytes. In contrast, it would take only N×U bytes to store the clustering information for each superpixel, K×M×U bytes to store the centroid vectors of all clusters, and K*(K−1)/2×U bytes to store the distances between each two clusters. Thus, using the techniques described herein, a data compression ratio of at least N×M/(N+K×M+K×(K−1)/2) can be achieved if centroid vectors are stored, and a compression ratio of at least N×M/(N+K×(K−1)/2) can be achieved if centroid vectors are not stored.

Figure 3A:
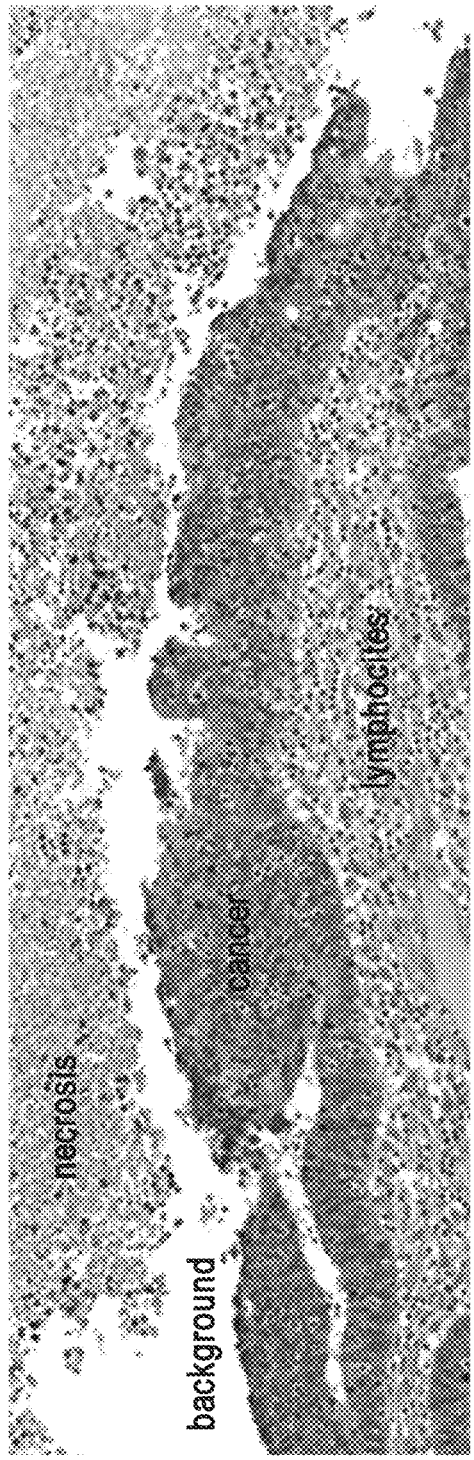
FIGS. 3A and 3B show, respectively, an exemplary biological specimen image having different regions and the same image overlaid by a plurality of superpixels generated therefor.
Figure 3B:

To illustrate with a more specific example, FIG. 3A shows an exemplary H&E image containing various types of regions, such as the necrosis region, the cancer (tumor) region, the lymphocytes region, and the background region. FIG. 3B shows the same image being overlaid with boundaries of exemplary superpixels generated for the image by superpixel generator 110. In this example, the number of generated superpixels is N=372. Assuming now that for each superpixel, the following image features are generated for each of the three color channels R, G, and B: a histogram of the intensity, a histogram of the gradient magnitude, and a histogram of the gradient direction. If each histogram includes 10 bins, for example, then the total number of features extracted for each superpixels is M=10×3×3=90. That is, each superpixel can be characterized by a ninety-dimensional feature vector. Clustering engine 112 can then be configured to cluster (e.g., using k-means) the feature vectors into K=10 clusters, resulting in ten ninety-dimensional centroid vectors representing the ten clusters. In this example, a compression ratio of 372×90/(372+10×90+10×9/2)=25.42 can be achieved if centroid vectors are stored, and an even higher compression ratio of 372×90/(372+10×9/2)=80.28 can be achieved if centroid vectors are not stored.

Figure 3C:
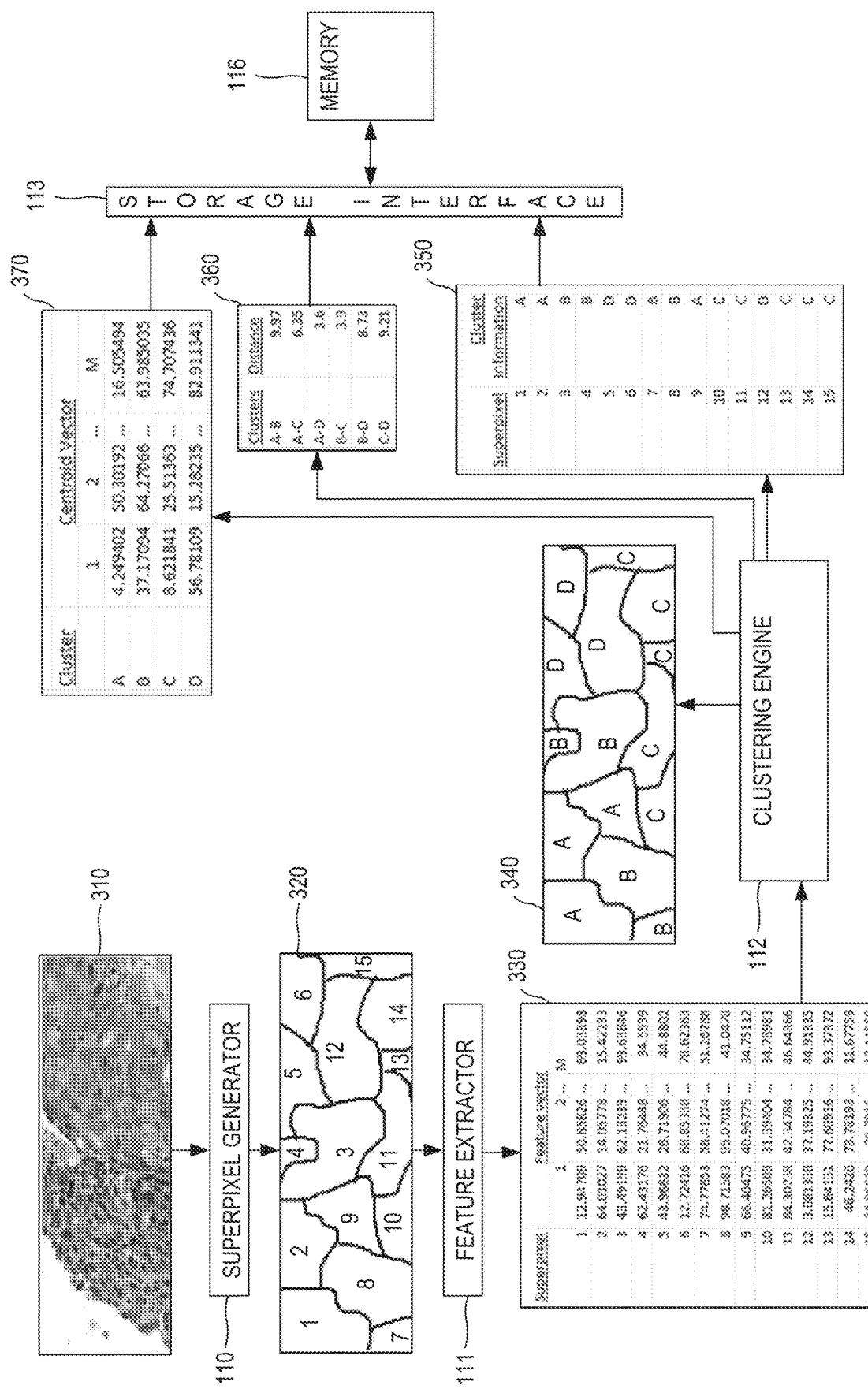
FIGS. 3C and 3D show block diagrams of an exemplary image being processed by various modules of the image analysis system.

FIG. 3C further illustrates some embodiments discussed above. FIG. 3C shows superpixel generator 110 obtaining an exemplary biological sample image 310 and producing a plurality of superpixels 320 based on biological sample image 310. Feature extractor 111 can then obtain the plurality of superpixels 320 and extract feature vectors 330 for all the superpixels. Clustering engine 112 can obtain feature vectors 330, and based at least on feature vectors 330, generated a predefined number of (in this example, four) clusters A, B, C, and D arranged, for example, as illustrated in clustering information 350 and visualized by clustering information image 340. As discussed above, each cluster can be characterized or represented by a centroid vector, as illustrated in exemplary centroid vector table 370. Clustering engine 112 can also precalculate distances between each pair of different clusters, as illustrated in exemplary distance table 360. Storage interface 113 can then store clustering information 350 into memory 116 (or any other memory). As discussed above, storage interface 113 can also store into memory distance table 360 and/or centroid vector table 370.

Figure 3D:
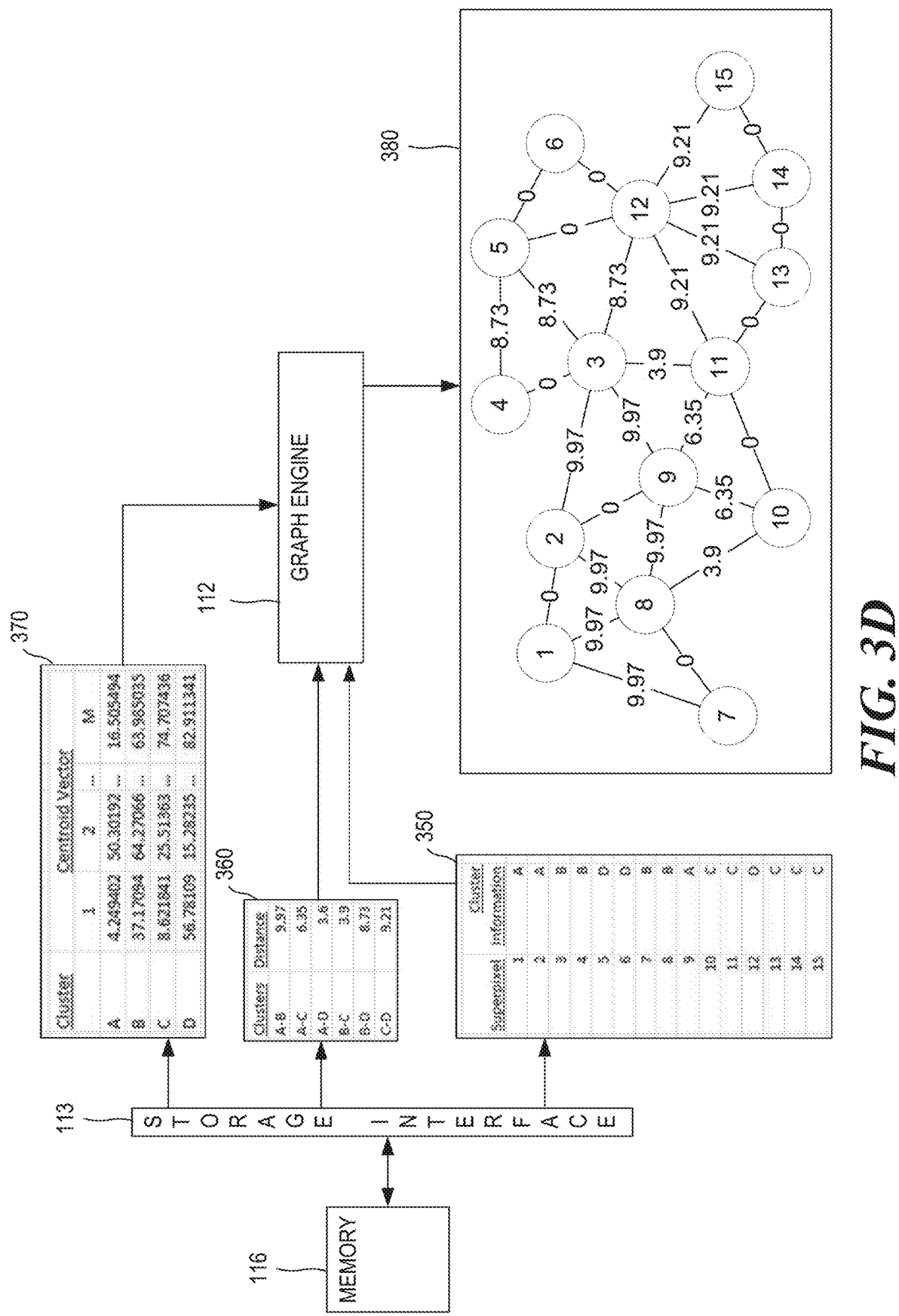

FIG. 3D shows graph engine 112 retrieving from memory 116 (through storage interface 113) clustering information 350, and distance table 360 and/or centroid vector table 370. Based at least on this information, graph engine 112 generates an exemplary graph 380.

In order to perform an image processing task using compressed (encoded) data, image analysis system 100 may use storage interface 113 to obtain, for each superpixel, clustering information identifying the cluster to which the superpixel belongs, and then use that that cluster's centroid vector instead of the superpixel's feature vector. Because the clustering algorithm ensures that all superpixels in a given cluster are relatively similar, the centroid vector of the cluster can be a sufficiently good approximation of the feature vector of each superpixel in the cluster, and the greater the number of clusters used, the better the approximation can be.

As discussed above, some image processing tasks rely solely on the distance between two superpixels, i.e., the distance between the superpixels' feature vectors. Such tasks can approximate the distance between superpixels by using the distance between centroid vectors of the two clusters to which the superpixels have been assigned. The distance can be calculated in real time based on the centroid vectors, if the centroid vectors have been stored. Alternatively, the distance can be obtained directly (without additional calculations) from a table or another data structure, if the distances have been precalculated and stored, as discussed above.

One type of image processing tasks that rely on the distance between superpixels' feature vectors rather than the values of the feature vectors themselves are graph-based image processing tasks. Graph-based image processing tasks may represent the superpixels in the image in the form of an interconnected graph, and perform various calculations using graph algorithms. To facilitate graph-based image processing tasks, image analysis system 100 may include a graph engine 114. Graph engine 114 may be configured to obtain (e.g., through storage interface) clustering information identifying which superpixel belongs to which cluster, and position information identifying the position of each superpixel within the image, or at least its position relative to other superpixels.

After obtaining this information, graph engine 114 can construct a graph that includes a plurality of nodes (vertices) where adjacent nodes correspond to adjacent superpixels within the image. In other words, nodes in the graph can be connected to each other directly (i.e., by a single edge) if and only if the superpixels those nodes represent are adjacent within the image. In some embodiments, the edges between every two nodes may correspond to the distance between the superpixels represented by the nodes, where the distance corresponds to the distance between the feature vectors of the superpixels and is approximated by the distance between the clusters to which the superpixels have been assigned. As discussed above, the distance between the clusters (i.e., between the clusters' centroid vectors) can be either calculated in real time if clusters' centroid vectors have been stored in the memory, or obtained from a table of precalculated distances if such a table has been stored in the memory.

After constructing the graph, graph engine 114 may use the graph to perform a graph-based image processing task. One such task is a segmentation operation whose objective is to segment the image (or the superpixels) into a plurality of regions. In some embodiments, before the segmentation task can be performed, graph engine 114 may collect from the user (e.g., through user-interface module 115) one or more annotations, where each annotation identifies a plurality of same-segment superpixels, i.e., superpixels that the user considers to belong to the same segment. For example, the user can draw one or more lines on top of one or more superpixels belonging to a first segment, then draw one or more additional lines (e.g., with a different color) on top of one or more superpixels belonging to a second segment, and so forth. Graph engine 114 can then use the graph to determine, for each superpixel that has not been annotated, to which of the annotated superpixels is the superpixel closest and assign it to the same segment as the annotated superpixel. To determine the distance between superpixels, graph engine 114 can use the shortest path measure, a smallest maximum path measure, or any other suitable graph distance measure.

In some embodiments, the annotations obtained from the user may be further used to determine different weights associated with different image features within the image, as discussed above. The weights can then be used by clustering engine 112, for example, in subsequent clustering operations.

It will be noted that using the techniques described herein, very high compression ratios can be achieved without significantly affecting the results of the image processing tasks operating on the compressed data. To illustrate, FIG. 4A shows the results of a segmentation operation operating on non-compressed data, i.e., on actual image features of each superpixel, and FIG. 4B shows the results of a segmentation operation operating on image features that were compressed (encoded) using the techniques described above. Both operations were initialized using the same user annotations 410. It can be appreciated that the segmentation results of the two operations (i.e., segments 420-A, 420-B, 420-C, and 420-D) are very similar, and it is appreciated that higher accuracy can be achieved with additional user annotations.

Figure 5:
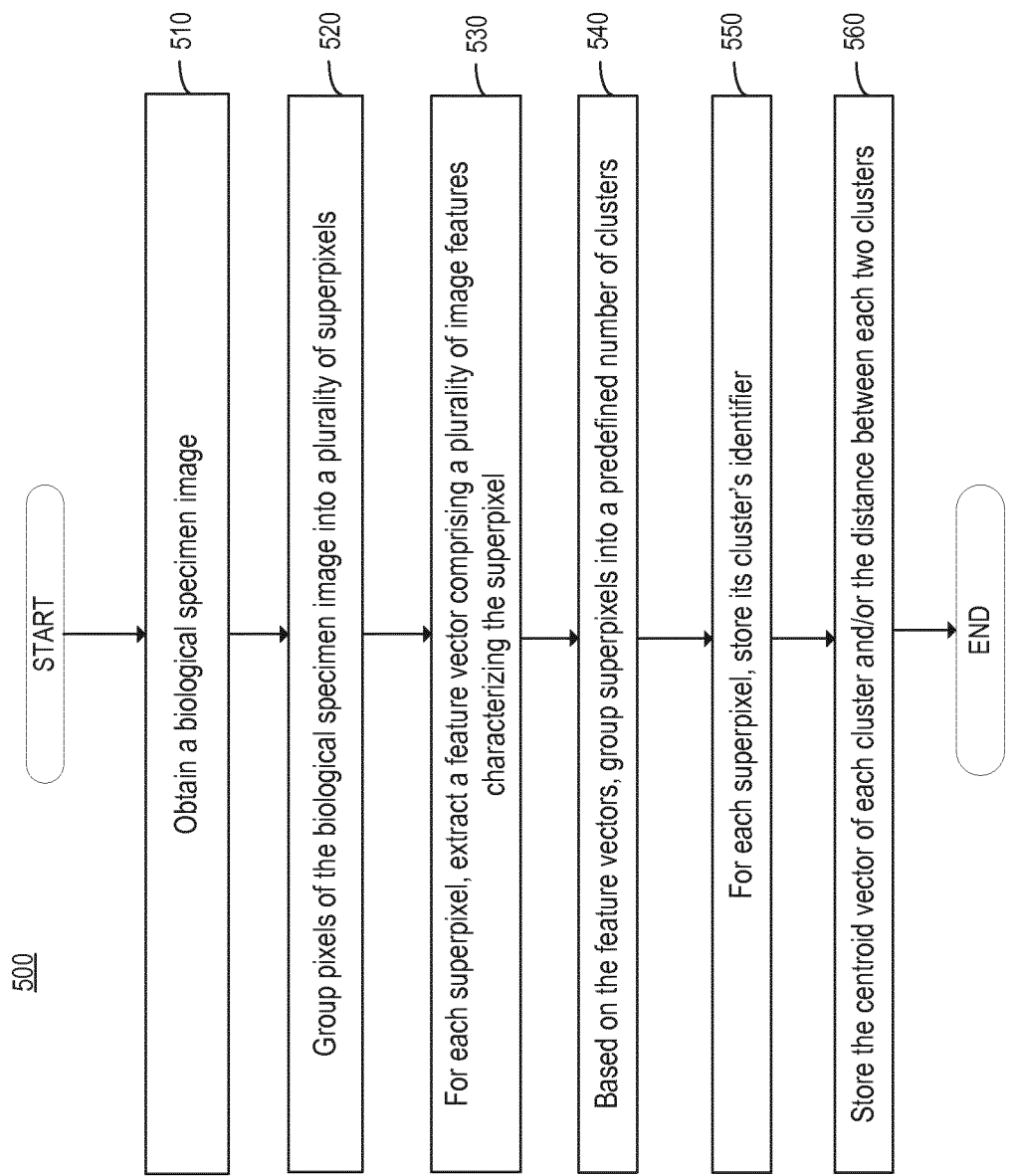
FIG. 5 shows a flowchart of an exemplary method for encoding image features of a biological specimen image.

FIG. 5 illustrates a flowchart of an exemplary method 500 for encoding image features of a biological specimen image. Method 500 may be executed, for example, by various modules of image analysis system 100 discussed above. Method 500 may be implemented, for example, in the form of executable instructions stored on at least one non-transitory machine-readable storage medium (e.g., memory 116) and executed by at least one processor or processor core (e.g., processor 117). Method 500 may also be implemented in the form of electronic circuitry (e.g., hardware), or in the form of some combination of electronic circuitry and instructions executable by a processor. It will be appreciated by persons skilled in the art based on the following description of method 500 that some blocks of method 500 may be executed substantially concurrently or in a different order than shown in FIG. 5; that method 500 may include more or less blocks than are shown in FIG. 5; and that some blocks of method 500 may, at certain times, be ongoing and/or may repeat.

Method 500 may begin at block 510 where the method may obtain a biological sample image, where, as discussed above, the biological sample may have been stained with staining platform 123, and the image of the biological sample may have been obtained by scanning platform 125. At block 520, the method may generate a plurality of superpixels for the image, i.e., group the pixels within the image into a plurality of superpixels, using, for example, superpixel generator 110. At block 530, the method may extract, for each superpixel (or substantially for each superpixel as in some embodiments some superpixels can be omitted or disregarded) a feature vector comprising a plurality of image features that characterize the superpixel. As discussed above, this operation can be performed, for example, by feature extractor 111.

At block 540, the method may use k-means clustering or another suitable algorithm to group the superpixels into a predefined number of clusters, using, for example, clustering engine 112, as discussed above. At block 550, the method may store for each superpixel its clustering information (e.g., its cluster's identifier), using, for example, storage interface 113, as discussed above. At block 560, the method may store either the centroid vectors of all clusters, or the precalculated distances between each two clusters, or both, using, for example, storage interface 113, as discussed above.

It is appreciated based on the foregoing discussion that in some embodiments, the method may include different or additional steps, such as retrieving the centroid vector of each cluster and/or the distances between each two clusters, and using the centroid vector of each cluster and/or the distances between each clusters to construct a graph, and performing a graph-based image processing task based on the graph. As discussed above, in some embodiments, the graph-based image processing task may include a segmentation operation that can use the graph and one or more user annotations to segment the biological specimen image into a plurality of segments. The method may also include determining a set of different weights for the different image features, where the generation of the predefined number of clusters and the association of each superpixel with the cluster are based at least in part on the set of different weights.

In the foregoing discussion, various devices, engines, units, or blocks (e.g., some or all blocks system 100) were described as being implementable using hardware, software, firmware, or any combination thereof. It must be appreciated by a person skilled in the art in view of the foregoing discussion that the hardware may include any type of analog and/or digital circuitry, such as integrated circuits (IC) (e.g., application-specific integrated circuits (ASICs) or field-programmable gate arrays (FPGAs)), or any other type of special- or general-purpose electronic circuitry. It must be further appreciated by a person skilled in the art that the software or firmware may include any type of processor executable instructions that can be stored on any type of tangible non-transitory computer-readable medium, where the instructions can be executed by a processing resource, causing the processing resource to implement the functionality of the respective component.

The executable instructions can be stored in memory 116, or in any other non-transitory computer-readable storage medium, which can be implemented as any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. The non-transitory computer-readable medium can be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, random access memory (RAM), read-only memory (ROM), and the like.

The processing resource for executing the instructions can be, for example, processor 117, or it can be any other processing resource, such as a CPU, a GPU, an FPGA, a TPU, another type of processor configured to retrieve and execute instructions, or a combination thereof. The processing resource can be integrated in a single device or distributed across devices, which may be integrated with image analysis system 100 or communicatively coupled to image analysis system 100.

Figure 6:
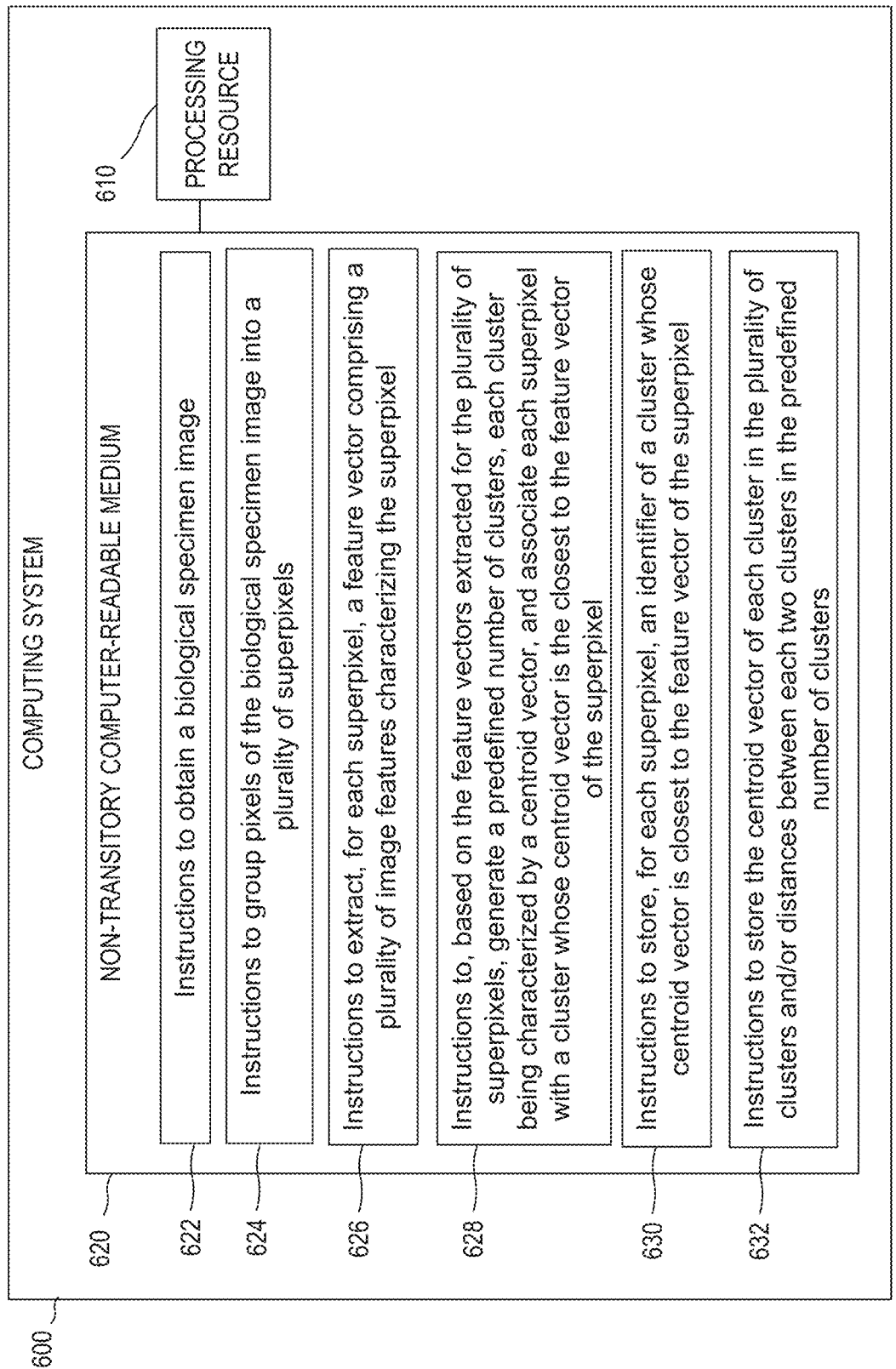
FIG. 6 shows an exemplary computing system comprising a processing resource and a non-transitory computer-readable medium storing instructions executable by the processing resource.

FIG. 6 illustrates an example computing device 600, in according to some embodiments. Computing system 600 may correspond, for example, to system analysis 100, to a portion thereof, or to any other computing system suitable for performing the functionality described below. Computing system 600 may include a processing resource 610, which, as discussed above, may correspond to processor 117 or to any other processing resource suitable for performing the functionality described below. Computing system 600 may also include a non-transitory computer-readable storage medium 620, which, as discussed above, may correspond to memory 116 or to any other non-transitory computer-readable storage medium capable of storing instructions executable by processing resource 610.

In the particular example shown in FIG. 6, medium 620 may store instructions 622, 624, 626, 628, 630, 632, and any other instructions that can be fetched, decoded, and executed by processing resource 610. Instead of or in addition to retrieving, decoding, and executing instructions, processing resource 610 may include any number of electronic circuits comprising any number of electronic components for performing the functionality of any number of instructions in machine-readable storage medium 620. With respect to the executable instruction representations (e.g., boxes) described and shown herein, it should be understood that part or all of the executable instructions and/or electronic circuits included within one box may, in other examples, be included in a different box shown in the figures or in a different box not shown.

Instructions 622, when executed by a processor (e.g., 610), may cause a computing system (e.g., 600) to obtain a biological specimen image. Instructions 624, when executed by the processor, may cause the computing system to group pixels of the biological specimen image into a plurality of superpixels. Instructions 626, when executed by the processor, may cause the computing system to extract, for each superpixel, a feature vector comprising a plurality of image features characterizing the superpixel. Instructions 628, when executed by the processor, may cause the computing system to, based on the feature vectors extracted for the plurality of superpixels, generate a predefined number of clusters, each cluster being characterized by a centroid vector, and associate each superpixel with a cluster whose centroid vector is the closest to the feature vector of the superpixel. Instructions 630, when executed by the processor, may cause the computing system to store, for each superpixel, an identifier of a cluster whose centroid vector is closest to the feature vector of the superpixel. Instructions 632, when executed by the processor, may cause the computing system to store the centroid vector of each cluster in the plurality of clusters and/or distances between each two clusters in the predefined number of clusters.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. An image analysis system comprising:
    one or more data processors; and
    a non-transitory computer readable storage medium containing instructions which, when executed on the one or more data processors, cause the one or more data processors to perform actions including:
    obtaining an image of a biological specimen;
    generating superpixels for the image, wherein the generating comprises grouping pixels of the image into the superpixels;
    extracting a feature vector from each of the superpixels, wherein the feature vector comprises image features that characterize the superpixel from which the feature vector was extracted;

grouping the superpixels into a predefined number of clusters based on the feature vectors extracted from each of the superpixels, wherein each of the clusters is characterized by a centroid vector, which is an approximation of the extracted feature vector from each of the superpixels grouped in the cluster, and the grouping comprises determining that the extracted feature vector from each of the superpixels is closest to the centroid vector of a cluster than to the centroid vector of any other cluster;

storing: (i) cluster information identifying the cluster to which each of the superpixels is grouped, and (ii) the centroid vectors of all clusters, as compressed data in a memory; and analyzing the image based on the compressed data, wherein the analyzing comprises, for each of the superpixels, obtaining the cluster information identifying the cluster to which the superpixel belongs, obtaining the centroid vector of the identified cluster, and using the centroid vector of the identified cluster instead of the feature vector of the superpixel to perform an image processing task.

2. The image analysis system of claim 1, wherein:

the analyzing further comprises: constructing a graph based at least on the compressed data, adjacent nodes in the graph correspond to adjacent superpixels in the image of the biological specimen and the adjacent nodes are connected by a weighted edge, the weighted edge has a weight corresponding to a distance between clusters to which the adjacent superpixels belong, and the image processing task is performed as a graph-based image processing task using the graph.

3. The image analysis system of claim 2, wherein the graph-based image processing task comprises a segmentation operation that groups the plurality of superpixels into a plurality of segments.

4. The image analysis system of claim 1, wherein the actions further include precalculating distances between each two clusters in the predefined number of clusters, wherein the distances between each two clusters is stored with the cluster information and the centroid vectors as the compressed data in the memory, and the analyzing comprises, for each of the superpixels, obtaining the cluster information identifying the cluster to which the superpixel belongs, obtaining the centroid vector of the identified cluster, obtaining the distances associated with the identified cluster, and using: (i) the centroid vector of the identified cluster instead of the feature vector of the superpixel, and (ii) the distances associated with the identified cluster, to perform the image processing task.

5. The image analysis system claim 1, wherein the actions further include collecting from a user at least one annotation identifying a plurality of same-segment superpixels in the image of the biological specimen.

6. The image analysis system of claim 5, wherein the actions further include determining a set of feature weights associated with the image features based on the at least one annotation.

7. The image analysis system of claim 6, wherein the superpixels are grouped into the predefined number of clusters based at least on the set of feature weights.

8. A method comprising:

obtaining an image of a biological specimen;

generating superpixels for the image, wherein the generating comprises grouping pixels of the image into the superpixels;

extracting a feature vector from each of the superpixels, wherein the feature vector comprises image features that characterize the superpixel from which the feature vector was extracted;

grouping the superpixels into a predefined number of clusters based on the feature vectors extracted from each of the superpixels, wherein each of the clusters is characterized by a centroid vector, which is an approximation of the extracted feature vector from each of the superpixels grouped in the cluster, and the grouping comprises determining that the extracted feature vector from each of the superpixels is closest to the centroid vector of a cluster than to the centroid vector of any other cluster;

storing: (i) cluster information identifying the cluster to which each of the superpixels is grouped, and (ii) the centroid vectors of all clusters, as compressed data in a memory; and analyzing the image based on the compressed data, wherein the analyzing comprises, for each of the superpixels, obtaining the cluster information identifying the cluster to which the superpixel belongs, obtaining the centroid vector of the identified cluster, and using the centroid vector of the identified cluster instead of the feature vector of the superpixel to perform an image processing task.

9. The method of claim 8, wherein:

the analyzing further comprises constructing a graph based at least on the compressed data, adjacent nodes in the graph correspond to adjacent superpixels in the image of the biological specimen and the adjacent nodes are connected by a weighted edge, the weighted edge has a weight corresponding to a distance between clusters to which the adjacent superpixels belong, and the image processing task is performed as a graph-based image processing task using the graph.

10. The method of claim 9, wherein the graph-based image processing task comprises a segmentation operation that groups the plurality of superpixels into a plurality of segments.

11. The method of claim 8, further comprising precalculating distances between each two clusters in the predefined number of clusters, wherein the distances between each two clusters is stored with the cluster information and the centroid vectors as the compressed data in the memory, and the analyzing comprises, for each of the superpixels, obtaining the cluster information identifying the cluster to which the superpixel belongs, obtaining the centroid vector of the identified cluster, obtaining the distances associated with the identified cluster, and using: (i) the centroid vector of the identified cluster instead of the feature vector of the superpixel, and (ii) the distances associated with the identified cluster, to perform the image processing task.

12. The method of claim 8, further comprising:

collecting from a user at least one annotation identifying a plurality of same-segment superpixels in the image of the biological specimen; and determining a set of feature weights associated with the image features based on the at least one annotation, wherein the superpixels are grouped into the predefined number of clusters based at least on the set of feature weights.

13. A non-transitory computer-readable memory storing a plurality of instructions executable by one or more processors, the plurality of instructions comprising instructions that when executed by the one or more processors cause the one or more processors to perform processing comprising:
obtaining an image of a biological specimen;
generating superpixels for the image, wherein the generating comprises grouping pixels of the image into the superpixels;
extracting a feature vector from each of the superpixels, wherein the feature vector comprises image features that characterize the superpixel from which the feature vector was extracted;
grouping the superpixels into a predefined number of clusters based on the feature vectors extracted from each of the superpixels, wherein each of the clusters is characterized by a centroid vector, which is an approximation of the extracted feature vector from each of the superpixels grouped in the cluster, and the grouping comprises determining that the extracted feature vector from each of the superpixels is closest to the centroid vector of a cluster than to the centroid vector of any other cluster;
storing: (i) cluster information identifying the cluster to which each of the superpixels is grouped, and (ii) the centroid vectors of all clusters, as compressed data in a memory; and
analyzing the image based on the compressed data, wherein the analyzing comprises, for each of the superpixels, obtaining the cluster information identifying the cluster to which the superpixel belongs, obtaining the centroid vector of the identified cluster, and using the centroid vector of the identified cluster instead of the feature vector of the superpixel to perform an image processing task.

14. The non-transitory computer-readable memory of claim 13, wherein:
the analyzing further comprises constructing a graph based at least on the compressed data, adjacent nodes in the graph correspond to adjacent superpixels in the image of the biological specimen and the adjacent nodes are connected by a weighted edge,
the weighted edge has a weight corresponding to a distance between clusters to which the adjacent superpixels belong, and
the image processing task is performed as a graph-based image processing task using the graph.

15. The non-transitory computer-readable memory of claim 14, wherein the graph-based image processing task comprises a segmentation operation that groups the plurality of superpixels into a plurality of segments.

16. The non-transitory computer-readable memory of claim 13, wherein the processing further comprises precalculating distances between each two clusters in the predefined number of clusters, wherein the distances between each two clusters is stored with the cluster information and the centroid vectors as the compressed data in the memory, and the analyzing comprises, for each of the superpixels, obtaining the cluster information identifying the cluster to which the superpixel belongs, obtaining the centroid vector of the identified cluster, obtaining the distances associated with the identified cluster, and using: (i) the centroid vector of the identified cluster instead of the feature vector of the superpixel, and (ii) the distances associated with the identified cluster, to perform the image processing task.

17. The non-transitory computer-readable memory of claim 13, wherein the processing further comprises:
collecting from a user at least one annotation identifying a plurality of same-segment superpixels in the image of the biological specimen; and
determining a set of feature weights associated with the image features based on the at least one annotation,
wherein the superpixels are grouped into the predefined number of clusters based at least on the set of feature weights.

* * * * *